Dec. 7, 1937.  A. W. L. HARTBAUER  2,101,368
REFRIGERATOR HATCH ARRANGEMENT
Filed April 6, 1934  5 Sheets-Sheet 1

INVENTOR
August W. L. Hartbauer
BY
ATTORNEY

Dec. 7, 1937.   A. W. L. HARTBAUER   2,101,368
REFRIGERATOR HATCH ARRANGEMENT
Filed April 6, 1934   5 Sheets-Sheet 2

INVENTOR
August W. L. Hartbauer
BY
ATTORNEY.

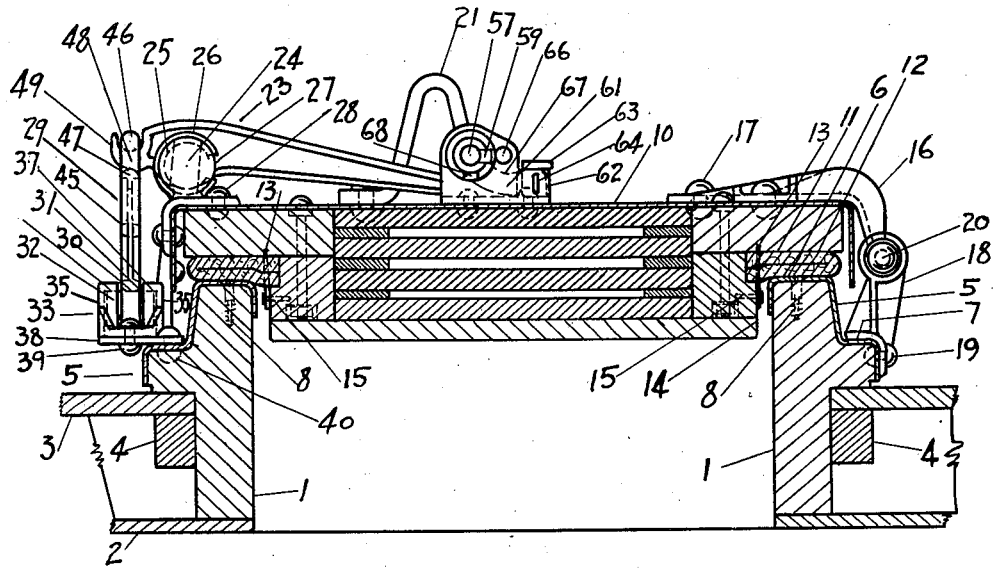
Fig. 5
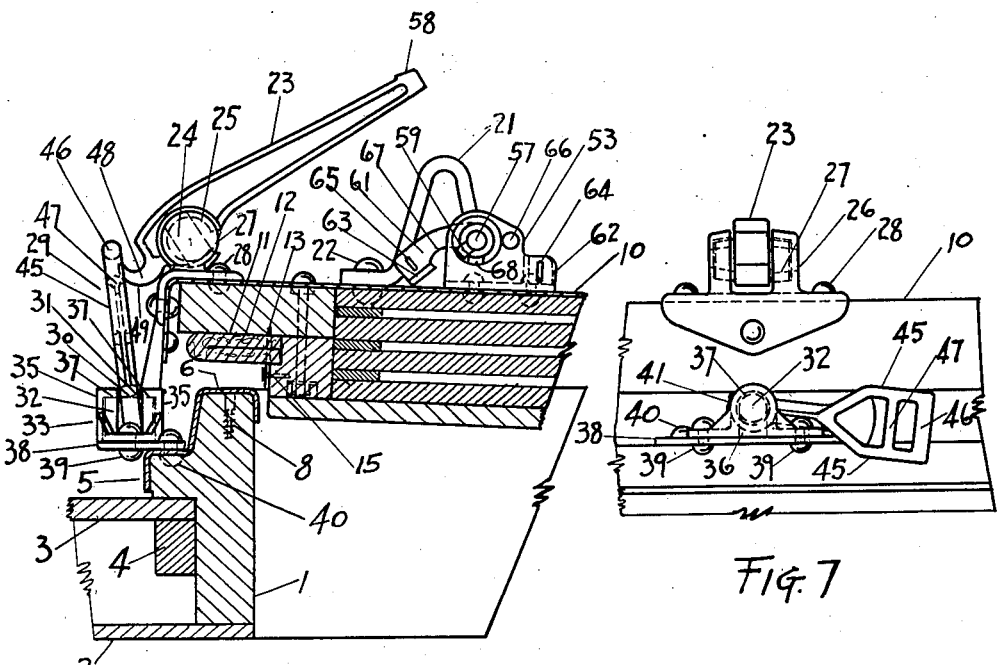
Fig. 6
Fig. 7
INVENTOR
August W. L. Hartbauer
By
ATTORNEY.

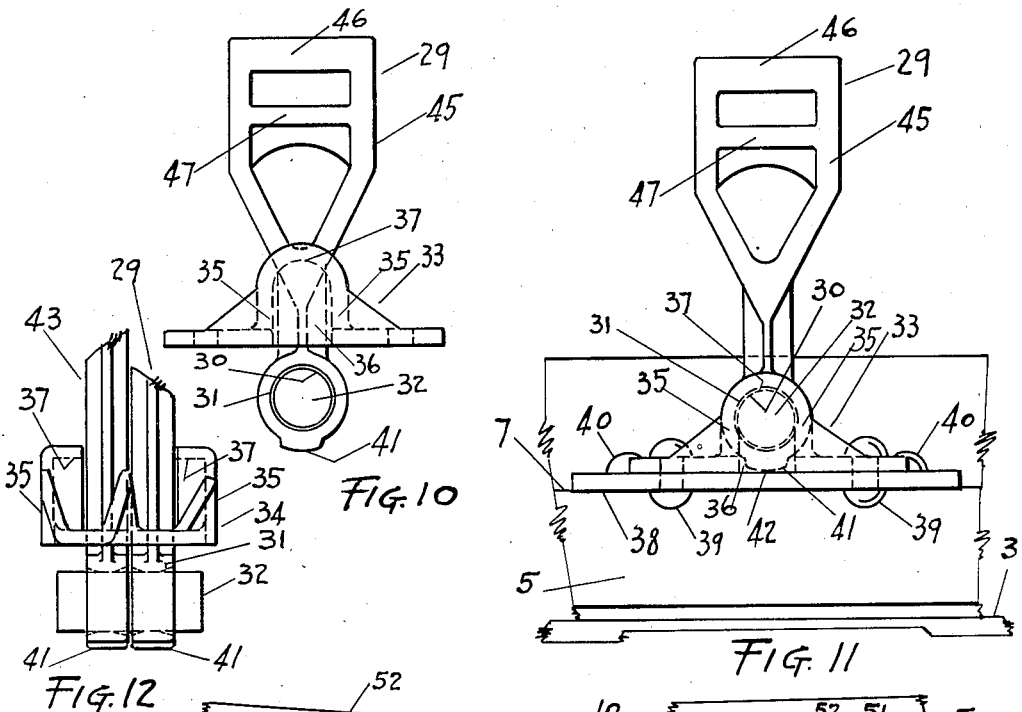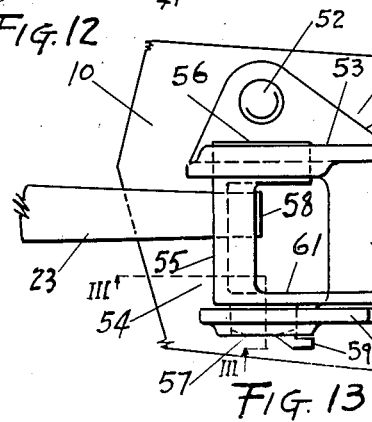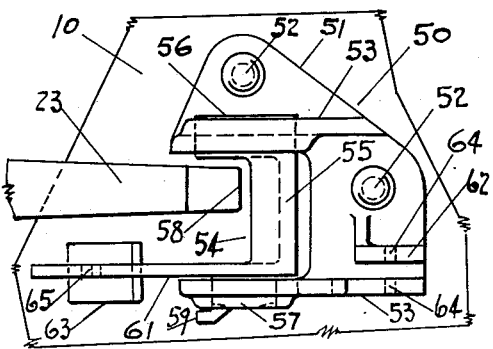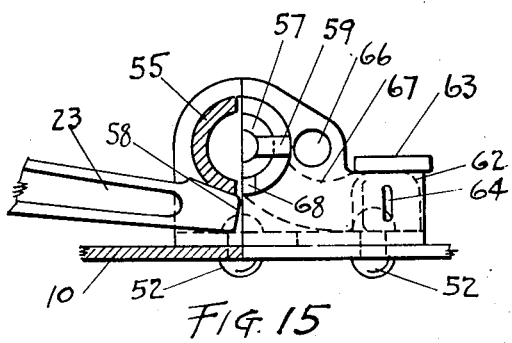

Patented Dec. 7, 1937

2,101,368

UNITED STATES PATENT OFFICE 2,101,368

REFRIGERATOR HATCH ARRANGEMENT

August William Louis Hartbauer, Chicago, Ill.

Application April 6, 1934, Serial No. 719,358

22 Claims. (Cl. 105—377)

This invention relates to a refrigerator car hatch cover, and also locking and operating means therefor.

In the past it has generally been the practice to use a hatch plug and a hatch cover as separate units. The plug is insulated and its beveled perimeter is padded or lined to provide yielding surfaces to contact with the similarly beveled surfaces of the hatch opening when the plug is moved into operative position.

The cover usually is made of two layers of tongued and grooved material placed at right angles to each other and fastened together. The hatch plug and cover are attached to the car frame members with hinges, so arranged that each unit can be operated separately. The cover is also provided with means to support the plug as the plug and cover are placed in ventilating position. Hasp and stable type of lock is commonly used and applied to the hatch cover, being utilized in both operating and ventilating positions of the hatch cover and plug.

It is always more or less difficult to properly seat the plug so that the perimeter of the plug contacts in a satisfactory manner with the face of the hatch frame members for the reason that the hinged relation with the hatch frame gives a fixed relation thereto, which does not compensate for the working tolerances of the component parts. Consequently the efficiency of the contact depends entirely on the yielding of the padding or lining, presenting a problem which has not been satisfactorily solved.

A further objection is that it has been necessary to adjust the padding or lining to suit the particular hatch opening for the reason that the hatch plug as constructed and lined will not yield to the degree necessary to compensate for working tolerances of the component parts of either the hatch plug or the hatch framing.

It is an object of the invention to eliminate the hatch plug by utilizing the hatch cover only, which will be adequately insulated and provided with contact surfaces for a gasket. The gasket is applied in such a manner that when compressed the contacting surfaces of the gasket will compensate for the working tolerances of either the cover or the hatch frame component parts.

It is a further object of the invention to provide a hatch mechanism arranged to suspend the hatch cover above the top of the hatch frame, to place the gasket between the spaced surfaces of the hatch cover and the top of the hatch frame, to contact the said surfaces of the hatch cover and the hatch frame forming a seal therewith and compress the same sufficiently by the operating mechanism to maintain said seal as the hatch cover is moved to the closed or locked position.

It is an additional object of the invention to provide an operating mechanism embodying means adapted to produce the necessary power to move the hatch cover to various operative positions, for ventilation purposes, for closing or locking the cover, or to break the seal to facilitate opening of same.

Further objects and advantages will be more readily apparent and more fully described in connection with the following description taken in connection with the accompanying drawings, in which—

Figure 5 is a sectional view taken upon line 5—5 of Figure 1 looking in the direction of the arrows, and shows the hatch cover in closed position and compressing the gaskets.

Figure 6 is a fragmentary sectional view similar to a portion of Figure 5 showing the hatch cover partially raised by means of the operating lever.

Figure 7 is a fragmentary elevational view similar to a portion of Figure 2 showing the locking link in released position.

Figure 10 is a front elevational view showing the locking link projecting downwardly through its housing to apply its wrist pin.

Figure 11 is a front elevational view showing the locking link and wrist pin drawn up in the housing or bracket.

Figure 12 is an elevational view showing portions of the locking and ventilating links projecting downwardly through the housing to apply the wrist pin.

Figure 13 is a fragmentary plan view of the lock assembly and shows the relation of the inner end of the operating lever and the keeper in locked position.

Figure 14 is a fragmentary plan view of the lock assembly and shows the relation of the inner end of the operating lever and the keeper in released position.

Figure 15 is a fragmentary elevational view of the lock assembly with a portion shown in section on the line III in Figure 13 and shows the relation of the inner end of the operating lever and the keeper in locked position.

Figure 1:
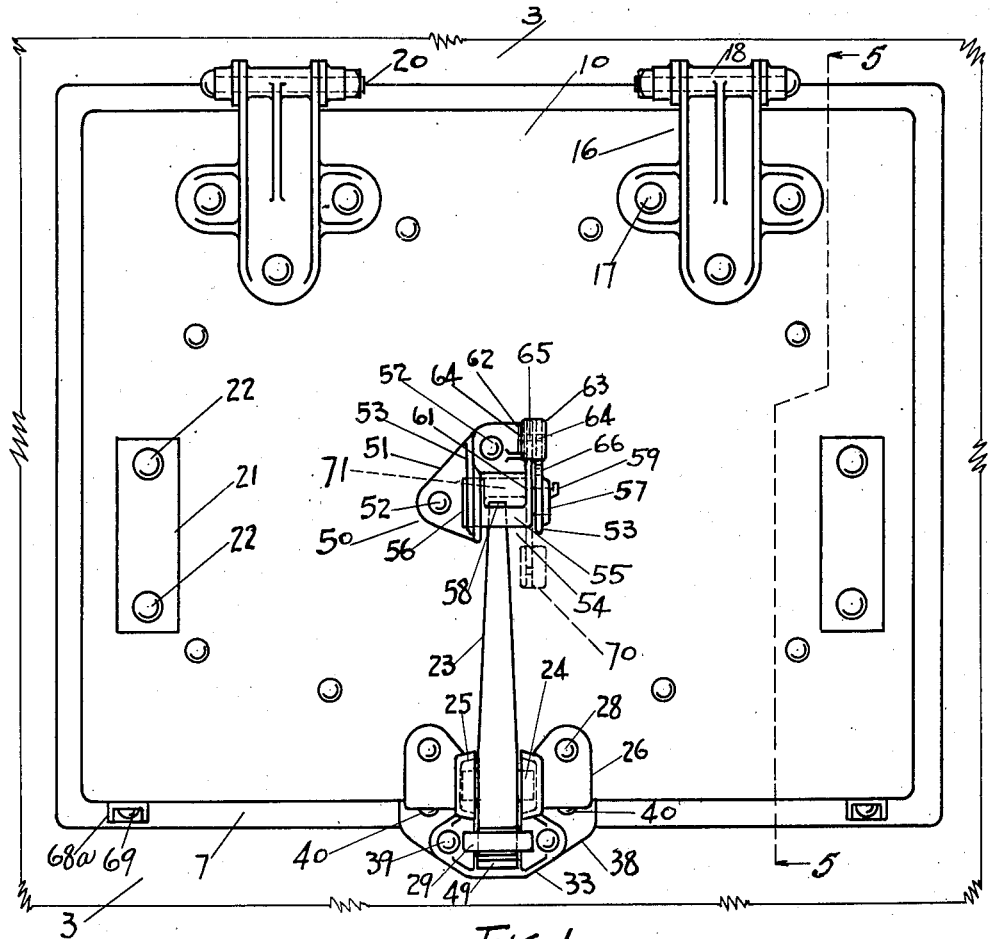
Figure 1 is a top plan view of a refrigerator car hatch embodying the hatch cover and mechanism of the invention.

As illustrative of the invention, there is shown a portion of a refrigerator car roof and a hatch opening with frame members 1 forming the sides and ends of the hatch opening, the frame members being above the ceiling 2. The roof 3 is supported by auxiliary furring 4 which is secured to the hatch frame members 1. The tops of the frame members 1 are provided with the metal hatch cap 5, shaped to form a flanged contact surface 6 for the gasket 12 and gasket surface 7 for attachment of the hatch cover mechanism, the metal cap 5 being secured to the frame members 1 by a series of screws 8.

Figure 9:
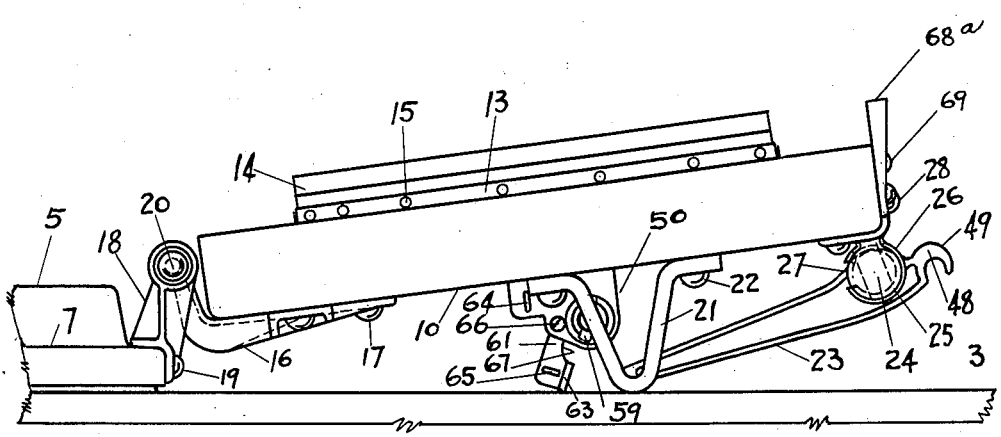
Figure 9 is an elevational view showing the hatch cover in open position.

The hatch cover 10 may be constructed and insulated in any well known manner, and be arranged to provide a gasket contact surface 11 with attachment surface 14 for the gasket retainer 13, in order to secure the gasket 12 with nails or screws 15. One edge of the hatch cover is supported by hinges. As shown, the hinge strap 16 is secured to the cover 10 with rivets 17, the hinge butt 18 is secured to the hatch cap 5 with rivets 19, and bolt 20 is used as a hinge pin to facilitate assembly. Stops 21 are secured to the hatch cover 10 with rivets 22. These stops are of sufficient height to contact with the roof 3 as shown in Figure 9, to prevent damage to the several parts of the closing mechanism as the hatch cover is in open position.

The operating lever 23 is provided with integrally formed trunnions 24 and assembled with trunnion bearings 25 and housing 26. The trunnions 24 enter ports 27 of housing 26. Housing 26 is secured to the hatch cover 10 with rivets 28. Assembly of lever 23 and the housing 26 can only be accomplished before the housing is secured to the hatch cover, for the reason that the end of lever 23 will foul the hatch cover 10 and prevent assembly in operative position.

The locking link 29 and the ventilating link 43 are provided with bearings 30 having convex surfaces 31 contacting the wrist pin 32 positioned therein. Similar reference numerals are used in the descriptions of the links 29 and 43.

The housings 33 and 34 are channel shaped, the flanges 35 being spaced apart providing for the assembly of the locking link 29, or the dual assembly of the locking link 29 and the ventilating link 43. Grooves 36 are formed by the flanges 35 projecting upward at an angle to the base of the housings 33 and 34. These grooves 36 are closed at the top to provide bearings 37 for the wrist pin 32.

To assemble the link 29 or 43 with the respective housing 33 or 34, the ends of the links are passed through the housings and the wrist pin 32 is inserted as shown in Figure 10. To seat the wrist pin 32 with bearings 37 the links 29 and 43 are retracted. To maintain this assembly the housing 33 or 34 is secured to the bracket 38 with rivets 39 as shown in enlarged view, Figure 11. The bracket 38 is secured to the surface 7 of the cap 5 with rivets 40.

Figure 2:
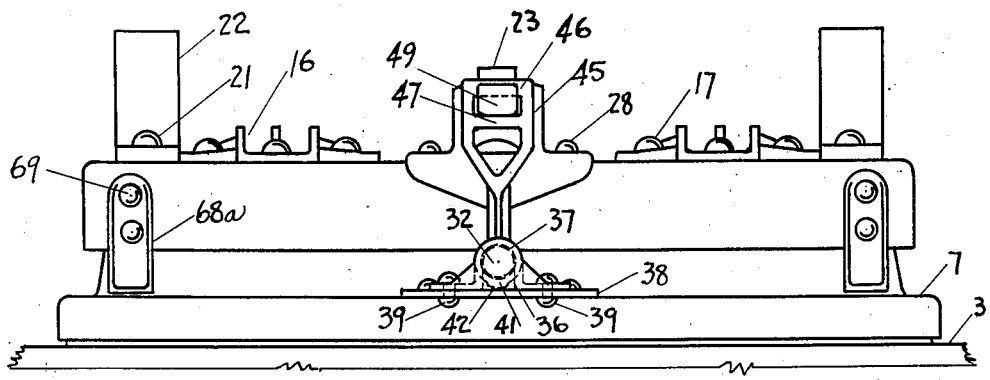
Figure 2 is an elevational view showing the hatch cover and mechanism, the cover being in locked position.
Figure 3:
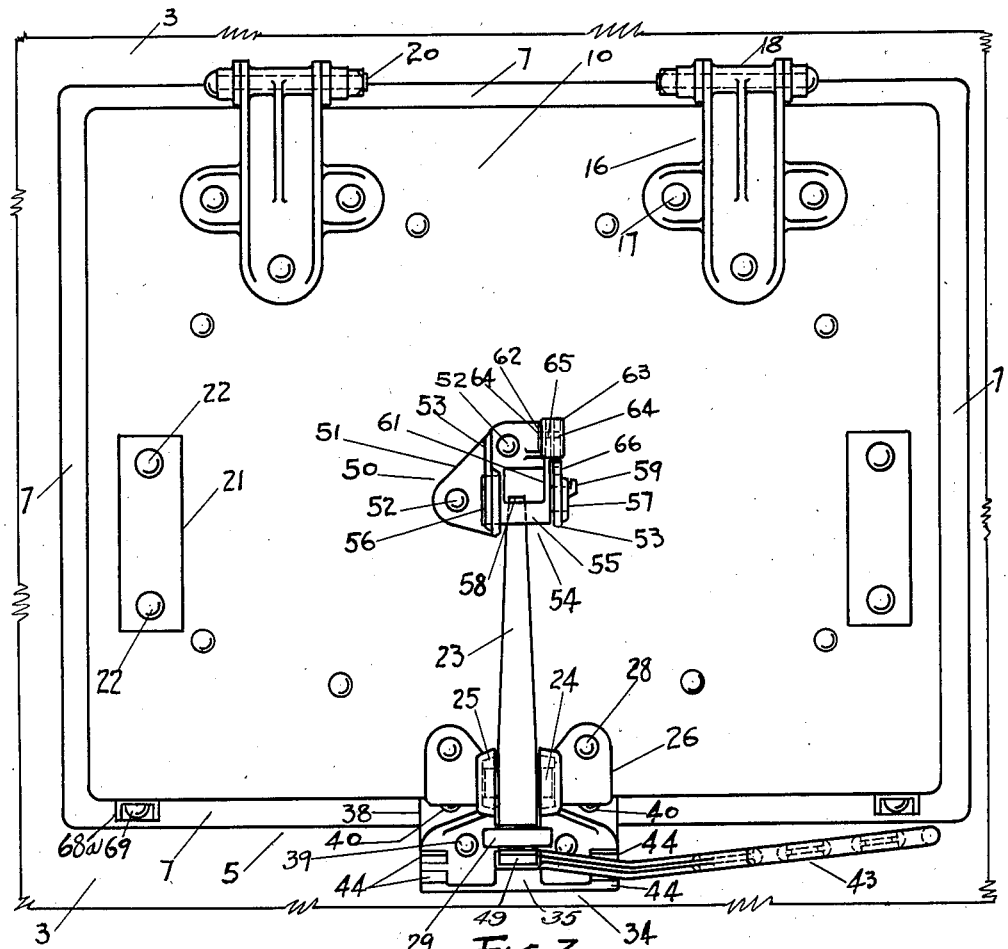
Figure 3 is a top plan view of a refrigerator car hatch embodying the hatch cover and mechanism including the locking and the ventilating links of the invention, the ventilating links being shown in a horizontal and released position.
Figure 4:
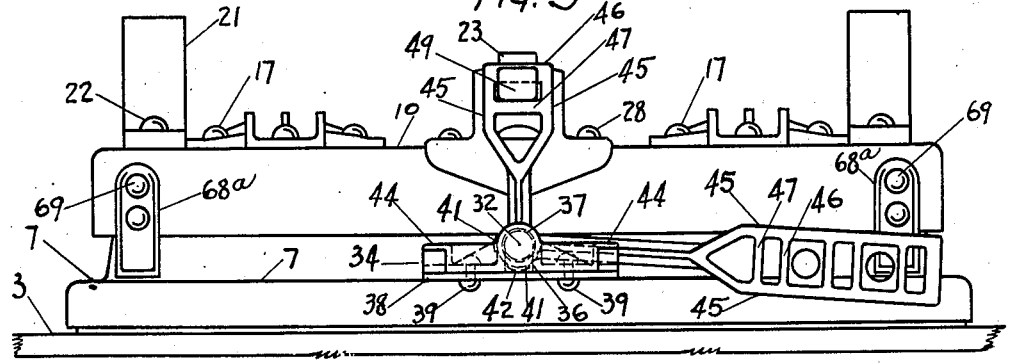
Figure 4 is an elevational view showing the hatch frame, hatch cover and mechanism, including locking and ventilating links, as shown in Figure 3.

To prevent gyration of the ventilating link 43 when in release position, bracket 34 is provided with guide lugs 44 which contact the ventilating link 43 as said link is moved to release position as in Figures 3 and 4. Liberal tolerances must be made in order that component parts will operate freely when moved to their respective release positions. For this reason the locking link 29 and the ventilating link 43 are each provided with a cam point 41. Each of these cam points 41 contacts the surface of the brackets 38 as at 42, as shown in Figures 2, 4 and 11, forcing the wrist pin 32 upwardly to contact with bearings 37, thus eliminating the tolerances as the links 29 and 43 are moved to operative position. The side member portions 45 of the links 29 and 43 are spaced apart to form supports for the cross members 46 and 47.

The tongue or arcuate lug 48 of the operating lever 23 is positioned between the cross members 46 and 47 contacting with said members when in operative position as shown in Figures 2, 4, 5 and 8. The tongue 48 is extended upward and positioned in close proximity to the outer face of the cross member 46 of the locking link 29 or the ventilating link 43 to maintain assembly when in operative position. The outer face 49 of the tongue 48 is tapered to facilitate assembly of the tongue 48 and the links 29 and 43, as these parts are moved to operative position as shown in Figure 6. It can readily be seen that the locking link 29 could be extended to incorporate therewith the features of the ventilating link 43 if desired.

The base 51 of the lever lock housing 50 contacts the hatch cover 10 and is secured thereto with rivets 52. The upwardly projecting flanges 53 form the bearing supports for the swinging keeper 54. The cross member 55 of the keeper 54 is positioned eccentric with respect to the center line of the bearings 56 and 57 and placed above the end 58 of the operating lever 23 to lock said lever 23 in operative position. A section of bearing 57 is extended to form retaining lug 59.

The housing 50 and the keeper 54 are assembled and then applied to the hatch cover 10 with the rivets 52, assembly being maintained by the lug 59 contacting the face of the flange 53. When in released position the arm 61 fouls the hatch cover 10 before the lug 59 registers with the assembly slot 60 in the flange 53, as shown in Figure 6.

To facilitate manipulation of the keeper 54, arm 61 is extended angularly with respect to the center line of the keeper bearings 56 and 57 to the end of the flange 53 and there positioned in a groove formed by the inner face of the flange 53 and bracket 62 of base 51. The cap 63 of arm 61 contacts with the top surface of the flange 53 serving as a stop for the arm 61 when in operative position.

To arrange for the application of the railway seal, slots 64 are provided in the flange 53 and the bracket 62 which register with slot 65 in arm 61 when keeper 54 is in operative position. As an alternate locking means the flange 53 of the lock housing 50 is provided with aperture 66 above the edge 67 of the arm 61 of keeper 54 for the use of any type of pad lock.

Compensating brackets 68—a secured to the hatch cover 10 with rivets 69 and arranged to contact with the surface of the metal cap 5, may be applied to assure distribution of the forces as the cover is moved to operative position by the operating lever 23.

The manner of operation will now be more specifically set forth.

Figure 8:
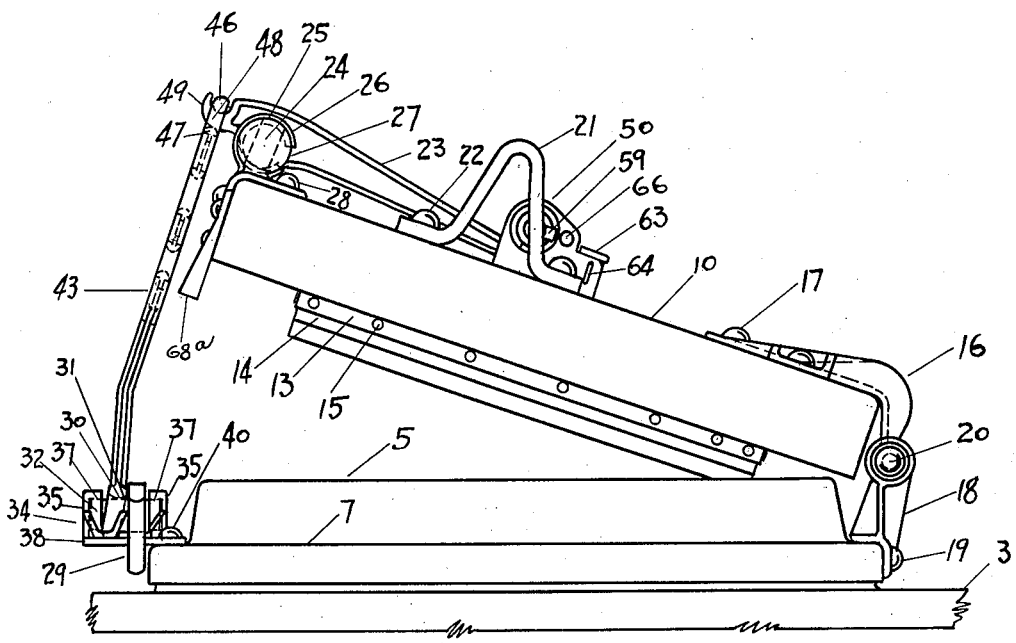
Figure 8 is a side elevational view showing the hatch cover in maximum ventilating position.

In Figures 1, 2, 3, 4 and 5 the hatch cover is shown in operative position, the keeper 54 confining and holding the operating lever 23 against movement. To raise the hatch cover 10 the keeper arm 61 is moved to the position 70, shown in dotted lines in Figure 1. The keeper bar 55 is then positioned at 71 as shown in Figure 1, permitting movement of the operating lever 23. The tongue 48 of the operating lever 23 will fulcrum on the locking link 29 as the lever 23 is moved, thereby compounding the applied force providing peak power at the start of the movement of the lever 23 which will be maintained until the lever tongue 48 disengages the locking link 29, at which point the hatch cover has been raised sufficiently to break the seal as shown in Figure 6. If grip on the operating lever 23 is maintained it is a simple operation to swing the cover 10 to full open position as shown in Figure 9, or to position the hatch cover at one of the ventilating stages or positions provided for in the ventilating link 43, by assembly of the operating lever 23 therewith, the operating lever 23 then being moved to operative position and confined against movement by the lock 50 as shown in Figure 8. As the operating lever 23 disengages either of the links 29 or 43, said links gravitate to release position as shown in Figures 3, 4 and 7.

Being aware that changes may be made in the parts and details of construction, without departing from the principles of this invention, I therefore do not purpose limiting the patent granted hereon otherwise than necessitated by the prior art.

Having described the invention, what I claim and desire to secure by Letters Patent is:

1. In a refrigerator car the combination of a hatch frame, a cover for said frame, a gasket interposed between said cover and said frame, said cover being suspended above said frame and gasket by means of hinges at one side of said cover and opening and closing means at the opposite side of said cover, the said gasket contacting the top surface of the hatch frame, said opening and closing means including a pair of links, said links being operated by a lever, one end of which is secured in a bearing, which bearing is secured to the hatch cover, the other end of the lever being adapted to be locked and unlocked in locking means secured to said cover.

2. In a refrigerator car the combination of a hatch frame, a hatch cover therefor, one side of said cover being hingedly attached to the hatch frame and the opposite side of the cover having operating means, said hinges and said operating means definitely spacing or suspending the cover above the hatch frame, a gasket, said gasket being positioned between said hatch frame and said cover in a plane similar to that of said cover and the top of said hatch frame, the arrangement between said cover and hatch frame being such that only sufficient pressure is transmitted to the gasket to effect or bring to a seal, said operating means including a bearing secured to said hatch cover, an operating lever movably secured in said bearing, a locking link, a ventilating link, said locking link and ventilating link having a single bearing, one end of said operating lever being adapted to engage in either of said links to lock said hatch cover or to open said hatch cover to a ventilating position.

3. In a refrigerator car the combination of a hatch frame, a hatch cover therefor, one side of said cover being hingedly attached to the hatch frame and the opposite side of the cover having operating means, said hinges and said operating means definitely spacing or suspending the cover above the hatch frame, a gasket, said gasket being positioned between said hatch frame and said cover in a plane similar to that of said cover and the top of said hatch frame, the arrangement between said cover and hatch frame being such that only sufficient pressure is transmitted to the gasket to effect or bring to a seal, said operating means including a bearing secured to said hatch cover, an operating lever movably secured in said bearing, a locking link, a ventilating link, said locking link and ventilating link having a single bearing, one end of said operating lever being adapted to engage in either of said links to lock said hatch cover or to open said hatch cover to a ventilating position, a locking mechanism secured to said hatch cover intermediate said hinges and said operating means, and the other end of said operating lever being adapted to be locked and unlocked by said last mentioned locking means.

4. In a refrigerator car the combination of a hatch frame, a hatch cover therefor, a gasket, said gasket lying in the same plane to said cover, said gasket serving to seal the space between said hatch frame and said cover, hinges at one side of said cover and operating means at the opposite side of said cover, locking means intermediate said hinges and said cover, said operating means including a pair of links, one of said links being longer than the other, a lever, said lever cooperating with the short link to close said hatch cover and said lever cooperating with said long link to open said cover and maintain the cover in open condition for ventilation purposes, the lower ends of each of said links being loosely mounted and held, said lower ends of said links being held in a bracket and the upper ends of said links being provided with link openings adapted to receive one end of said operating lever to respectively open and close said hatch cover.

5. In a refrigerator car the combination of a hatch frame, a hatch cover therefor, a gasket, said gasket lying in the same plane to said cover, said gasket serving to seal the space between said hatch frame and said cover, hinges at one side of said cover and operating means at the opposite side of said cover, locking means intermediate said hinges and said cover, said operating means including a pair of links, one of said links being longer than the other, a lever, said lever cooperating with the short link to close said hatch cover and said lever cooperating with said long link to open said cover and maintain the cover in open condition for ventilation purposes, the lower ends of each of said links being loosely mounted and held, said lower ends of said links being held in a bracket and the upper ends of said links being provided with link openings adapted to receive one end of said operating lever to respectively open and close said hatch cover, and a locking mechanism intermediate said hinges and said operating means, said locking mechanism being secured to said hatch cover and being provided with bearings and a keeper, said keeper swinging in said bearings to lock and unlock the end of said operating lever away from said locking and ventilating links.

6. In a refrigerator car the combination of a hatch frame, a hatch cover therefor, a gasket, said gasket causing said cover to be spaced apart from the top face of the hatch frame when said cover is in operative position, a bracket attached to the top of said cover, an operating lever movably mounted in said bracket, a pair of links, an additional bracket, said bracket being secured to said hatch frame, the lower ends of said links being loosely and swingingly mounted in said last named bracket, said links being provided with apertures, said lever being provided with an arcuate extension, said arcuate extension fitting in any of said apertures in said links to raise or lower said cover.

7. In a refrigerator car the combination of a hatch frame, a hatch cover therefor, a gasket, said gasket causing said cover to be spaced apart from the top face of the hatch frame when said cover is in operative position, a bracket attached to the top of said cover, an operating lever movably mounted in said bracket, a pair of links, an additional bracket, said bracket being secured to said hatch frame, the lower ends of said links being loosely and swingingly mounted in said last named bracket, said links being provided with apertures, said lever being provided with an arcuate extension, said arcuate extension fitting in any of said apertures in said links to raise or lower said cover, said arcuate extension on said operating lever extending upwardly, and when extending through any of said apertures in said links preventing disassembly of the respective links and the lever from their operative positions.

8. In a refrigerator car the combination of a hatch frame, a hatch cover therefor, said cover being hingedly secured at one side to the frame and being removably secured at the opposite side of the cover by operating means, said operating means including a pair of links, an operating lever, said links being swingingly and loosely mounted in a bracket, said bracket being secured to said frame, the links being arranged to gyrate and move to facilitate assembly with one end of said operating lever.

9. In a refrigerator car the combination of a hatch frame, a hatch cover therefor, said cover being hingedly secured at one side to the frame and being removably secured at the opposite side of the cover by operating means, said operating means including a pair of links, an operating lever, said links being swingingly and loosely mounted in a bracket, said bracket being secured to said frame, the links being arranged to gyrate and move to facilitate assembly with one end of said operating lever, one of said pairs of links being relatively short to cooperate with said hatch cover to close the same against said hatch frame, and the other of said links being relatively long and containing a series of apertures adapted to cooperate with said cooperating lever to hold said cover in an open or ventilating position.

10. In a refrigerator car the combination of a hatch frame, a hatch cover therefor, said cover being hingedly secured at one side to the frame and being removably secured at the opposite side of the cover by operating means, said operating means including a pair of links, an operating lever, said links being swingingly and loosely mounted in a bracket, said bracket being secured to said frame, the links being arranged to gyrate and move to facilitate assembly with one end of said operating lever, one of said pairs of links being relatively short to cooperate with said hatch cover to close the same against said hatch frame, and the other of said links being relatively long and containing a series of apertures adapted to cooperate with said cooperating lever to hold said cover in an open or ventilating position, and a locking means attached to said hatch cover comprising a housing, bearings in said housing, a swinging keeper in said housing positioned eccentrically with reference to the center line of the bearings, said keeper being adapted to lock and unlock the free end of said operating lever.

11. In a refrigerator car the combination of a hatch frame, a hatch cover therefor, a trunnion bearing attached to the top of said hatch cover, an operating lever movably mounted in said trunnion bearing, a pair of links, a bracket, said bracket being secured to said hatch frame, the bracket being provided with a pair of covered bearings open at their lower ends, a wrist pin, the lower ends of each of said links being apertured for the reception of said wrist pin, said lower ends of said links and said wrist pin adapted to be raised respectively upon operation of said links by said lever.

12. In a refrigerator car the combination of a hatch frame, a hatch cover therefor, a trunnion bearing attached to the top of said hatch cover, an operating lever movably mounted in said trunnion bearing, a pair of links, a bracket, said bracket being secured to said hatch frame, the bracket being provided with a pair of covered bearings open at their lower ends, a wrist pin, the lower ends of each of said links being apertured for the reception of said wrist pin, said lower ends of said links and said wrist pin adapted to be raised respectively upon operation of said links by said lever, said bracket also being provided with guiding means for said links when said links are in released or operative position.

13. In a refrigerator car the combination of a hatch frame, a hatch cover, therefor, a bearing attached to the top of said hatch cover, an operating lever movably mounted in said bearing, a pair of links, a bracket, said bracket being secured to said hatch frame, the bracket being provided with a pair of covered bearings open at their lower ends, a wrist pin, the lower ends of each of said links being apertured for the reception of said wrist pin, said lower ends of said links and said wrist pin adapted to be raised respectively upon operation of said links by said lever, said bracket also being provided with guiding means for said links when said links are in released or inoperative position, said guides causing said links when in released or inoperative position to lie in front of the hatch cover substantially parallel thereto and be held out of the path of the hatch cover.

14. In a refrigerator car the combination of a hatch frame, a hatch cover therefor, a bearing attached to the top of said hatch cover, an operating lever movably mounted in said bearing, a pair of links, a bracket, said bracket being secured to said hatch frame, the bracket being provided with a pair of covered bearings open at their lower ends, a wrist pin, the lower ends of each of said links being apertured for the reception of said wrist pin, said lower ends of said links and said wrist pin adapted to be raised respectively upon operation of said links by said lever, said bracket also being provided with guiding means for said links when said links are in released or inoperative position, said guides causing said links when in released or inoperative position to lie in front of the hatch cover substantially parallel thereto and be held out of the path of the hatch cover, said guides being on both sides of said links and on both sides of said bracket.

15. In a refrigerator car the combination of a hatch frame, a hatch cover therefor, a bearing attached to the top of said hatch cover, an operating lever movably mounted in said bearing, a pair of links, a bracket, said bracket being secured to said hatch frame, the bracket being provided with a pair of covered bearings open at their lower ends, a wrist pin, the lower ends of each of said links being apertured for the reception of said wrist pin, said lower ends of said links and said wrist pin adapted to be raised respectively upon operation of said links by said lever, the lower ends of each of said links being provided with a cam to contact the base of the bracket forcing the wrist pin in contact with said bearings as the links are moved to their respective operative positions and there constructed to gyrate or move to facilitate assembly with the operating lever.

16. In a refrigerator car the combination of a hatch frame, a hatch cover therefor, a bearing attached to the top of said hatch cover, said bearing having covered tops and also side openings, an operating lever movably mounted in said bearing, said operating lever being provided with laterally extending lugs adapted to enter said side openings and rotate in said bearing beneath said cover, a locking link, a bracket, said bracket being secured to said hatch frame, the bracket being provided with covered bearings open at their lower ends, a wrist pin, the lower end of said link being apertured for the reception of said wrist pin, said lower end of said link and said wrist pin being adapted to be raised upon operation of said link by said lever.

17. In a refrigerator car the combination of a hatch frame, a hatch cover therefor, a bearing attached to the top of said hatch cover, said bearing having covered tops and also side openings, an operating lever movably mounted in said bearing, said operating lever being provided with laterally extending lugs adapted to enter said side openings and rotate in said bearing beneath said cover, a pair of links, the lower ends of each of said links being apertured for the reception of said wrist pin, said lower ends of said links and said wrist pin being adapted to be raised respectively upon operation of said links by said lever, one of said links being for the purpose of locking said hatch cover and the other of said links being for the purpose of holding said hatch cover in a raised or ventilating position.

18. In a refrigerator car the combination of a hatch frame, a hatch cover therefor, a bearing attached to the top of said cover, said bearing being provided with covered portions with cutouts in the sides of said portions, an operating lever, said operating lever being provided with laterally extending lugs, said lugs being adapted to enter said cutouts to permit the lever to be mounted in said bearing prior to the securing of said bearing to said hatch cover and to be held in said bearing by said covers against removal after said bearing and lever have been finally secured to said hatch cover, a bracket, said bracket being provided with a pair of covered bearings open at their lower ends, a locking link mounted in said bracket, said locking link being held in said bracket by a wrist pin, said wrist pin and said link being raised upon operation thereof by said lever to lock said hatch cover.

19. In a refrigerator car the combination of a hatch frame, a hatch cover therefor, said hatch cover being hingedly supported at one side and supported at the opposite side by an operating mechanism, said operating mechanism comprising a bearing, an operating lever permanently but loosely held in said bearing, a bracket, a locking link, said locking link being adapted to be engaged by one end of said operating lever, the other end of said lever being removably held by a locking mechanism interposed intermediate said hinges and operating mechanism, said intermediate mechanism consisting of a bracket secured to said hatch cover and a swinging keeper mounted in said bracket, said keeper having an arm and said bracket having a pair of lugs, said apertures in said arm and said lugs adapted to receive a seal or lock to hold said keeper against movement while said keeper is holding the end of the operating lever in locked position.

20. In a refrigerator car the combination of a hatch frame, a hatch cover therefor, said hatch cover being hingedly supported at one side and supported at the opposite side by an operating mechanism, said operating mechanism comprising a bearing, an operating lever permanently but loosely held in said bearing, a bracket, a locking link, said locking link being adapted to be engaged by one end of said operating lever, the other end of said lever being removably held by a locking mechanism interposed intermediate said hinges and operating mechanism, said intermediate mechanism consisting of a bracket secured to said hatch cover and a swinging keeper mounted in said bracket, said keeper having an arm and said bracket having a pair of lugs, said apertures in said arm and said lugs adapted to receive a seal or lock to hold said keeper against movement while said keeper is holding the end of the operating lever in locked position, one of said lugs of said bracket having an additional aperture for the reception of an auxiliary lock to hold said keeper arm in locked position.

21. In a refrigerator car the combination of a hatch frame, a cover for said frame, a gasket interposed between said cover and said frame, said cover being suspended above said frame and gasket by means of hinges at one side of said cover and opening and closing means at the opposite side of said cover, the said gasket contacting the top surface of the hatch frame, said opening and closing means including a link, said link being operated by a lever, one end of which is secured in a bearing, which bearing is secured to the hatch cover, the other end of the lever being adapted to be locked and unlocked in locking means secured to said cover.

22. In a refrigerator car the combination of a hatch frame, a hatch cover therefor, said cover being hingedly secured at one side to the frame and being removably secured at the opposite side of the cover by operating means, said operating means including a link, an operating lever, said link being swingingly and loosely mounted in a bracket, said bracket being secured to said frame, the link being arranged to gyrate and move to facilitate assembly with one end of said operating lever.

AUGUST W. L. HARTBAUER.